United States Patent
Son

(10) Patent No.: US 9,446,707 B2
(45) Date of Patent: Sep. 20, 2016

(54) APPARATUS AND METHOD FOR CONTROLLING HEADLAMP

(71) Applicant: SL Corporation, Daegu (KR)

(72) Inventor: Young Ho Son, Gyeongsan (KR)

(73) Assignee: SL Corporation, Daegu (KR)

( * ) Notice: Subject to any disclaimer, the term of this patent is extended or adjusted under 35 U.S.C. 154(b) by 527 days.

(21) Appl. No.: 13/676,726

(22) Filed: Nov. 14, 2012

(65) Prior Publication Data

US 2013/0135881 A1    May 30, 2013

(30) Foreign Application Priority Data

Nov. 25, 2011 (KR) .................. 10-2011-0124216

(51) Int. Cl.
| | | |
|---|---|---|
| B60Q 1/00 | (2006.01) | |
| B60Q 1/08 | (2006.01) | |
| F21S 8/10 | (2006.01) | |
| B60Q 1/14 | (2006.01) | |
| B60Q 1/46 | (2006.01) | |

(52) U.S. Cl.
CPC .............. *B60Q 1/08* (2013.01); *B60Q 1/0023* (2013.01); *B60Q 1/1423* (2013.01); *B60Q 1/46* (2013.01); *F21S 48/1794* (2013.01)

(58) Field of Classification Search
CPC ...... B60Q 1/085; B60Q 1/08; B60Q 1/0023; B60Q 1/1423; F21S 48/1784; F21S 48/1794
USPC ......................................................... 362/466
See application file for complete search history.

(56) References Cited

U.S. PATENT DOCUMENTS

| | | | | |
|---|---|---|---|---|
| 2,986,063 | A * | 5/1961 | Etzenhouser | ................. 359/229 |
| 5,339,226 | A * | 8/1994 | Ishikawa | ....................... 362/539 |
| 7,201,505 | B2 * | 4/2007 | Sugimoto et al. | ............ 362/539 |
| 8,459,849 | B2 * | 6/2013 | Grimm et al. | ................ 362/539 |

(Continued)

FOREIGN PATENT DOCUMENTS

| | | |
|---|---|---|
| DE | 10 2004 053 228 A1 | 5/2006 |
| DE | 10 2006 017 132 A1 | 10/2007 |

(Continued)

OTHER PUBLICATIONS

European Search Report mailed Jun. 18, 2015 in corresponding EP Application No. 12007798.7.

*Primary Examiner* — Anh Mai
*Assistant Examiner* — Matthew Peerce
(74) *Attorney, Agent, or Firm* — Mintz Levin Cohn Ferris Glovsky and Popeo, P.C.; Kongsik Kim; Colleen H. Witherell

(57) ABSTRACT

Disclosed herein is an apparatus and a method for controlling a headlamp, and more particularly, an apparatus and a method for controlling a headlamp to perform a flashing function more efficiently while a vehicle is being driven. The apparatus includes, a rotating shield including a first shield protrusion portion which includes a plurality of protrusions formed in a direction of a rotation axis of a rotatable body and a second shield protrusion portion disposed on a side of the first shield protrusion portion; a sensor detecting a light distribution pattern of a vehicle based on a rotation angle of the rotating shield; and a rotating unit rotating the rotating shield at a predetermined angle toward the first or second shield protrusion portion, which forms the detected light distribution pattern, in order to perform a flashing function.

15 Claims, 9 Drawing Sheets

(56) References Cited

U.S. PATENT DOCUMENTS

| | | | |
|---|---|---|---|
| 8,740,431 B2* | 6/2014 | Jeong | 362/539 |
| 2006/0139938 A1* | 6/2006 | Hayami | 362/466 |
| 2009/0109697 A1* | 4/2009 | Kim et al. | 362/512 |
| 2009/0116259 A1* | 5/2009 | Ohshio et al. | 362/512 |
| 2009/0154187 A1* | 6/2009 | Kim et al. | 362/539 |
| 2009/0310378 A1* | 12/2009 | Tatara et al. | 362/538 |
| 2010/0164382 A1* | 7/2010 | Lee et al. | 315/82 |
| 2013/0170243 A1* | 7/2013 | Na et al. | 362/516 |
| 2013/0177202 A1* | 7/2013 | Dierks et al. | 382/103 |

FOREIGN PATENT DOCUMENTS

| | | |
|---|---|---|
| DE | 10 2007 035 289 A1 | 1/2009 |
| EP | 1 033 528 A2 | 9/2000 |
| EP | 2 244 007 A1 | 10/2010 |
| EP | 2 279 908 A2 | 2/2011 |
| EP | 2 292 464 A1 | 3/2011 |
| EP | 2 295 291 A1 | 3/2011 |
| EP | 2 381 165 A1 | 10/2011 |
| KR | 20-0282037 Y1 | 7/2002 |
| KR | 20-2011-0006481 U | 6/2011 |
| KR | 10-2011-0084786 A | 7/2011 |

* cited by examiner

APPARATUS AND METHOD FOR CONTROLLING HEADLAMP

CROSS-REFERENCE TO RELATED APPLICATIONS

This application claims priority from Korean Patent Application No. 10-2011-0124216 filed on Nov. 25, 2011, the entire contents of which are incorporated herein by reference.

BACKGROUND OF THE INVENTION

1. Field of the Invention

The present invention relates to an apparatus and method for controlling a headlamp, and more particularly, to an apparatus and method for controlling a headlamp to perform a flashing function more efficiently while a vehicle is being driven.

2. Description of the Related Art

A vehicle is equipped with automotive lamps that have a lighting function and a signaling function, among others. Moreover, automotive lamps enable a driver of the vehicle to easily detect objects around and ahead of the vehicle while driving at night or in a dark area. Automotive lamps also inform other vehicles and road users of the vehicle's driving state.

For example, a headlamp and a fog lamp are designed for the lighting function, and a direction indicator, a taillight, a brake light, and a side marker are designed for the signaling function. Of these lamps, the automotive headlamp performs the essential function of securing the driver's field of view at night by emitting light in the same direction as the driving direction of the vehicle.

However, with such an automotive headlamp, it may be difficult to provide an optimal driving environment according to driving conditions of a vehicle, such as traveling speed, road surface, and surrounding brightness. Therefore, a recent technology proposed an adaptive front lighting system capable of changing a light distribution pattern according to driving conditions of a vehicle. The adaptive front lighting system changes a cut-off pattern of light emitted from a light source, thereby adaptively changing the light distribution pattern according to the driving condition.

The adaptive front lighting system may adaptively change a low-beam light distribution pattern. On some roads, (e.g., expressways) the adaptive front lighting system uses a function for changing a high-beam light distribution pattern. While driving a vehicle, a user may input a control command for initiating a flashing function to alert drivers ahead.

FIG. 1 is an exemplary side view illustrating the rotation direction and operation of a conventional shield for performing a flashing function.

Referring to FIG. 1, a current light distribution pattern of a headlamp may be a Class-C light distribution pattern and in order to perform the flashing function, the distribution pattern may be changed from the Class-C light distribution pattern to a high-beam (High) light distribution pattern via various light distribution patterns including a Class-V light distribution pattern and an anti-dazzle high-beam (DHB) light distribution pattern.

That is, to perform the flashing function, the current light distribution pattern determined by the shield rotated in a certain direction may be changed from the Class-C light distribution pattern to the high-beam light distribution pattern. Thus, this process requires many changes of light distribution patterns. In addition, since the shield may be rotated by a very large angle (i.e., 0 to 180 degrees) to change from the Class-C light distribution pattern to the high-beam light distribution pattern, it takes long until the flashing function may be performed.

SUMMARY OF THE INVENTION

Aspects of the present invention provide an apparatus and method for controlling a headlamp of a vehicle to perform a flashing function quickly by detecting a light distribution pattern of the headlamp and rotating a shield in a direction in which the shield is rotated by a smaller angle based on the detected light distribution pattern.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, an apparatus for controlling a headlamp is disclosed. The apparatus includes: a rotating shield including a first shield protrusion portion which includes a plurality of protrusions formed in a direction of a rotation axis of a rotatable body and a second shield protrusion portion disposed on a side of the first shield protrusion portion; a sensor detecting a light distribution pattern of a vehicle based on a rotation angle of the rotating shield; and a controller configured to rotate the rotating shield at a predetermined angle toward the first or second shield protrusion portion, which forms the detected light distribution pattern, to perform a flashing function.

According to another aspect of the present invention, a method of controlling a headlamp is disclosed. The method includes: detecting, by a sensor, a light distribution pattern of a vehicle based on a rotation angle of a rotating shield including a first shield protrusion portion and a second shield protrusion portion disposed on a side of the first shield protrusion portion; and rotating, by a controller, the rotating shield at a predetermined angle toward the first or second shield protrusion portion, forming the detected light distribution pattern, to perform a flashing function.

BRIEF DESCRIPTION OF THE DRAWINGS

The above and other objects, advantages and features of the present invention will now be more clearly understood from the following detailed description taken in conjunction with the accompanying drawings, in which.

DESCRIPTION OF PREFERRED EMBODIMENTS

Figure 1:
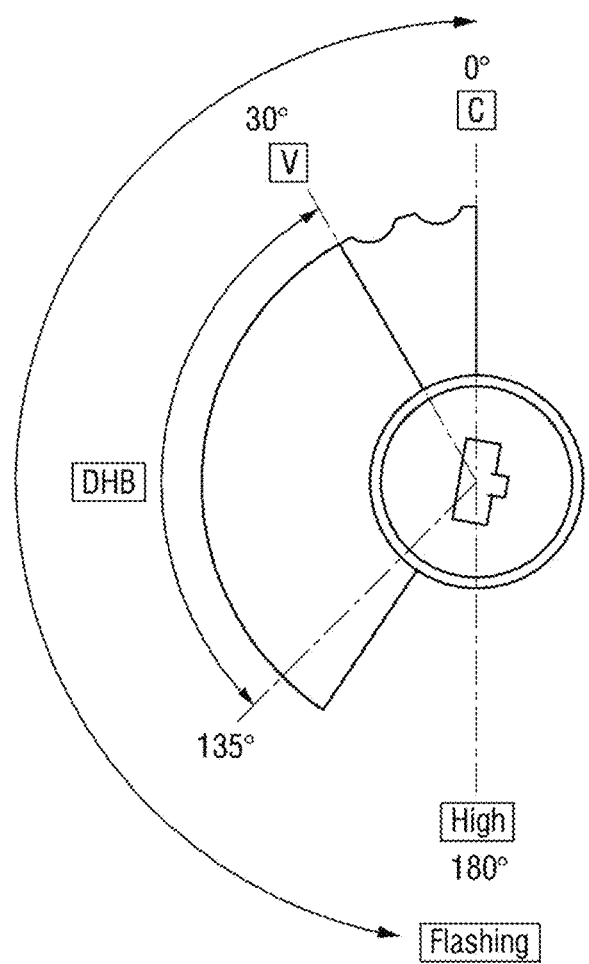
FIG. 1 is an exemplary side view illustrating the rotation direction and operation of a conventional shield for performing a flashing function, according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided for this disclosure to be thorough and complete and will fully convey the concept of the invention to those skilled in the art, and the present invention will only be defined by the appended claims. Like reference numerals refer to like elements throughout the specification.

In some embodiments, well-known processing processes, well-known structures and well-known technologies will not be specifically described in order to avoid ambiguous interpretation of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, and/or operations, but do not preclude the presence or addition of one or more other components, steps, operations, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although the below exemplary embodiments are described as using a plurality of units to perform the above process, it is understood that the above processes may also be performed by a single controller or unit. Additionally, it is well understood that a single controller or a plurality of controllers may be utilized to execute each of the above described units. Accordingly, these units may be embodied as hardware or software which is executed by a controller or a processor.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Embodiments of the invention are described herein with reference to perspective, cross-sectional, side, and/or schematic illustrations that are exemplary illustrations of idealized embodiments of the invention. Moreover, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, each component may be exaggerated or reduced for clarity.

An apparatus and method for controlling a headlamp according to embodiments of the present invention will now be described with reference to the attached drawings.

Figure 2:
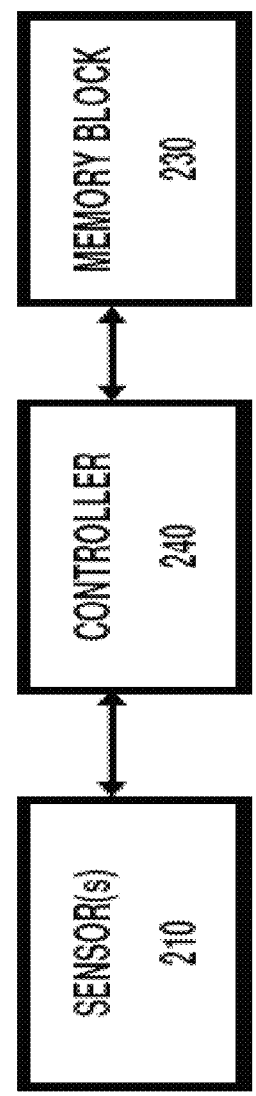
FIG. 2 is an exemplary block diagram of an apparatus for controlling a headlamp, according to an exemplary embodiment of the present invention.

FIG. 2 is an exemplary block diagram of an apparatus 200 for controlling a headlamp according to an embodiment of the present invention.

Referring to FIG. 2, the headlamp control apparatus 200 according to the current embodiment may include a sensor 210, a controller 240 and a memory block 230.

The sensor 210 detects a current light distribution pattern based on a rotation angle of a rotating shield. When a user inputs a flashing control command to initiate a flashing function, the sensor 210 detects the current light distribution pattern based on the rotation angle of the rotating shield. Here, the flashing control command input by the user may also be input by a flashing control switch (not shown).

In particular, the sensor 210 detects whether the current light distribution pattern of a vehicle is a light distribution pattern (i.e., a low-beam light distribution pattern) formed by a first shield protrusion portion or a light distribution pattern (i.e., an anti-dazzle high-beam light distribution pattern) formed by a second shield protrusion portion. In addition, the sensor 210 may include a hall sensor (not shown) to detect the rotation angle of the rotating shield. Based on the detected rotation angle, the sensor 210 may detect whether the current light distribution pattern is the anti-dazzle high-beam light distribution pattern or the low-beam light distribution pattern. For example, if the rotation angle of the rotating shield is within a predetermined range, the sensor 210 may detect that the current light distribution pattern is the anti-dazzle high-beam light distribution pattern. If the rotation angle is not within the predetermined range, the sensor 210 may detect that the current light distribution pattern is the low-beam light distribution pattern.

Figure 5:
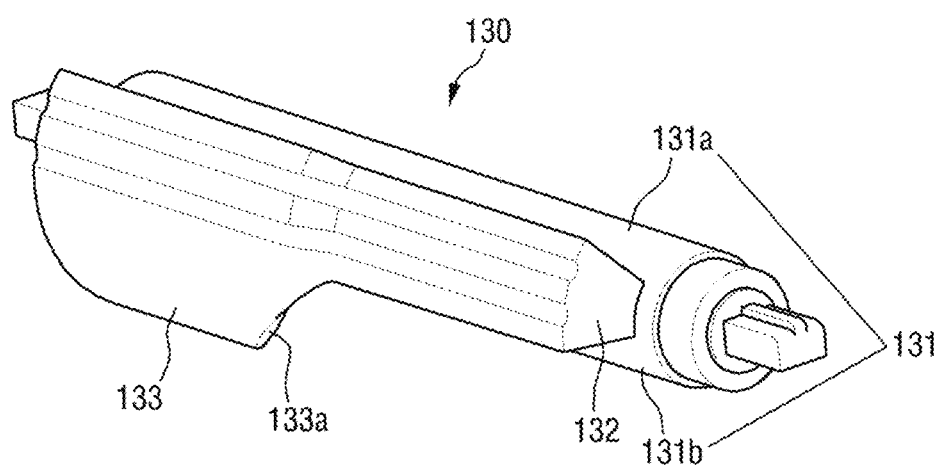
FIG. 5 is an exemplary view of a rotating shield according to an exemplary embodiment of the present invention.

Referring to FIG. 5, a body 131 of a rotating shield 130 includes a region (hereinafter, a first region) on a side thereof and another region (hereinafter, a second region) on the other side thereof. The first region forms the low-beam light distribution pattern using a first shield protrusion portion 132 which includes a plurality of protrusions having a predetermined cut-off pattern, and the second region forms the anti-dazzle high-beam light distribution pattern using a second shield protrusion portion 133. In addition, a portion of the body 131 disposed adjacent to the first region is set as a first flashing region 131*a* for performing the flashing function, and a portion of the body 131 disposed adjacent to the second region is set as a second flashing region 131*b*. Therefore, the body 131 of the rotating shield 130 includes the first region, the second region, the first flashing region 131a, and the second flashing region 131b.

Here, the flashing function refers to controlling a headlamp to flicker for a short time interval to alert drivers ahead. In other words, the flashing function refers to changing the headlamp from a light distribution pattern (i.e., the low-beam light distribution pattern or the anti-dazzle high-beam light distribution pattern) other than the light-beam light distribution pattern to a high-beam light distribution pattern a preset number of times. The flashing function is performed in response to the flashing control command input by the flashing control switch. A light distribution pattern for the flashing function (hereinafter, a flashing light distribution pattern) is formed lower than the high-beam light distribution pattern since part of the light is blocked by an edge of the first shield protrusion portion 132 and an edge of the second shield protrusion portion 133. That is, an upper part of the flashing light distribution pattern is blocked by the first shield protrusion portion 132 and the second shield protrusion portion 133. Therefore, the flashing light distribution pattern provides only a warning function, without dazzling drivers ahead as much as the high-beam light distribution pattern.

To perform the flashing function, the controller 240 rotates the rotating shield at a predetermined angle based on the sensing result of the sensor 210. Here, the predetermined angle is a preset arbitrary angle. Referring back to FIG. 5, when a light distribution pattern detected by the sensor 210 is a light distribution pattern formed by the first shield protrusion portion 132, the controller 240 rotates the rotating shield 130 toward the second shield protrusion portion 133 such that the first flashing region 131a set on the other side of the first shield protrusion portion 132 from the second shield protrusion portion 133 performs the flashing function.

That is, the controller 240 is configured to rotate the rotating shield 130, which is rotated based on the current light distribution pattern, in a direction in which the rotating shield 130 is rotated by a smaller angle. Thus, the flashing function may be performed more quickly.

The memory block 230 stores the first region, the second region, the first flashing region 131a and the second flashing region 131b formed in the body 131 of the rotating shield 130.

The controller 240 controls the operations of the steps 210 through 230, constituting the headlamp control apparatus 200.

Figure 3:
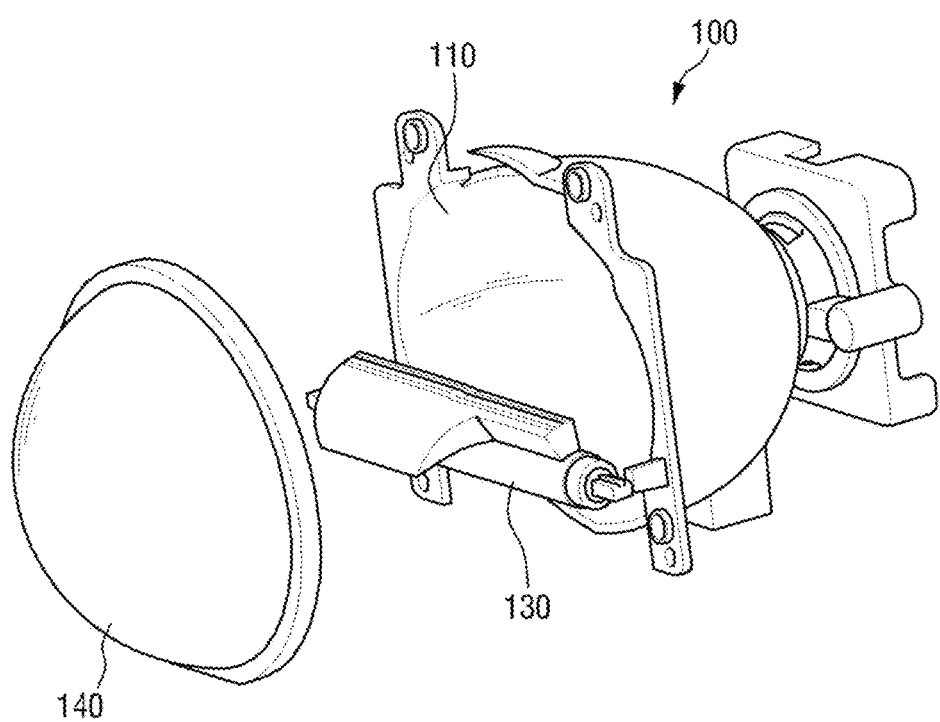
FIG. 3 is an exemplary view of a headlamp, according to an exemplary embodiment of the present invention.
Figure 4:
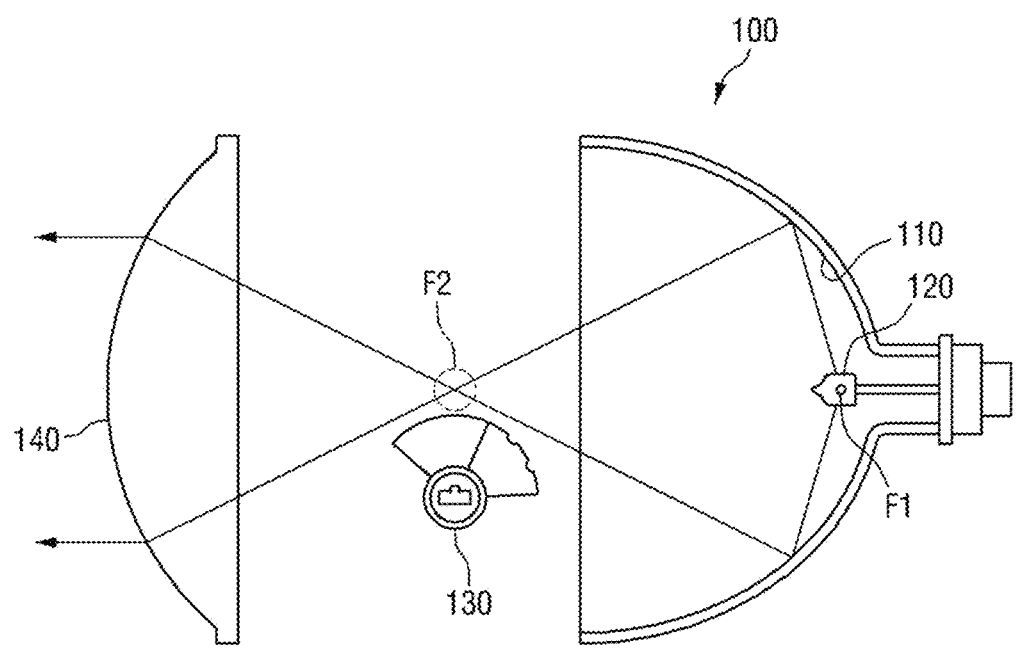
FIG. 4 is an exemplary side view of the headlamp shown in FIG. 3, according to an exemplary embodiment of the present invention.

FIG. 3 is an exemplary view of a headlamp 100 according to an exemplary embodiment of the present invention. FIG. 4 is an exemplary side view of the headlamp 100 shown in FIG. 3. The headlamp 100 shown in FIGS. 3 and 4 may be understood as a left or right headlamp of a vehicle.

Referring to FIGS. 3 and 4, the headlamp 100 according to the current embodiment may include an ellipsoidal reflector 110; a light source 120, disposed near a first focus F1 of the reflector 110; a rotating shield 130, disposed near a second focus F2 of the reflector 110 and blocks part of light emitted from the light source 120 according to a light distribution pattern; and a lens 140 which projects light forward of a vehicle.

The light source 120 according to the current embodiment may be, but is not limited to, a halogen lamp, a high-intensity discharge, or a light-emitting diode.

FIG. 5 is an exemplary view of a rotating shield 130 according to an exemplary embodiment of the present invention.

Referring to FIG. 5, the rotating shield 130 may include a cylindrical, rotatable body 131; a first shield protrusion portion 132, including a plurality of protrusions for changing to the low-beam light distribution pattern; and a second shield protrusion portion 133 for changing to the anti-dazzle high-beam light distribution pattern.

The first shield protrusion portion 132 may form the low-beam light distribution pattern (such as Class-C, Class-V, Class-E or Class-W) according to the state of a vehicle. The protrusions included in the first shield protrusion portion 132 may have a different cut-off pattern (i.e., a different top surface shape) according to the light distribution pattern. The low-beam light distribution pattern formed by the first shield protrusion portion 132 may be included in the first region described above with reference to FIG. 2.

The second shield protrusion portion 133 may form the anti-dazzle high-beam light distribution pattern to create a dark area corresponding to the position or distance of a vehicle ahead. The second shield protrusion portion 133 may include a step portion 133a formed at a predetermined angle to a direction of a rotation axis of the body 131 to increase or decrease the dark area for anti-dazzle high beams as the body 131 rotates. An end of the step portion 133a may be disposed in a middle of the body 131 and may extend along a circumference of the body 131 gradually becoming closer to an end of the body 131. In the current embodiment, when the end of the step portion 133a is disposed in the middle of the body 131 may be described as an example. However, this is merely an example used to help understand the present invention, and the position of the end of the step portion 133a may be changed. The anti-dazzle high-beam light distribution pattern formed by the second shield protrusion portion 133 may be included in the second region described above with reference to FIG. 2.

Figure 6:
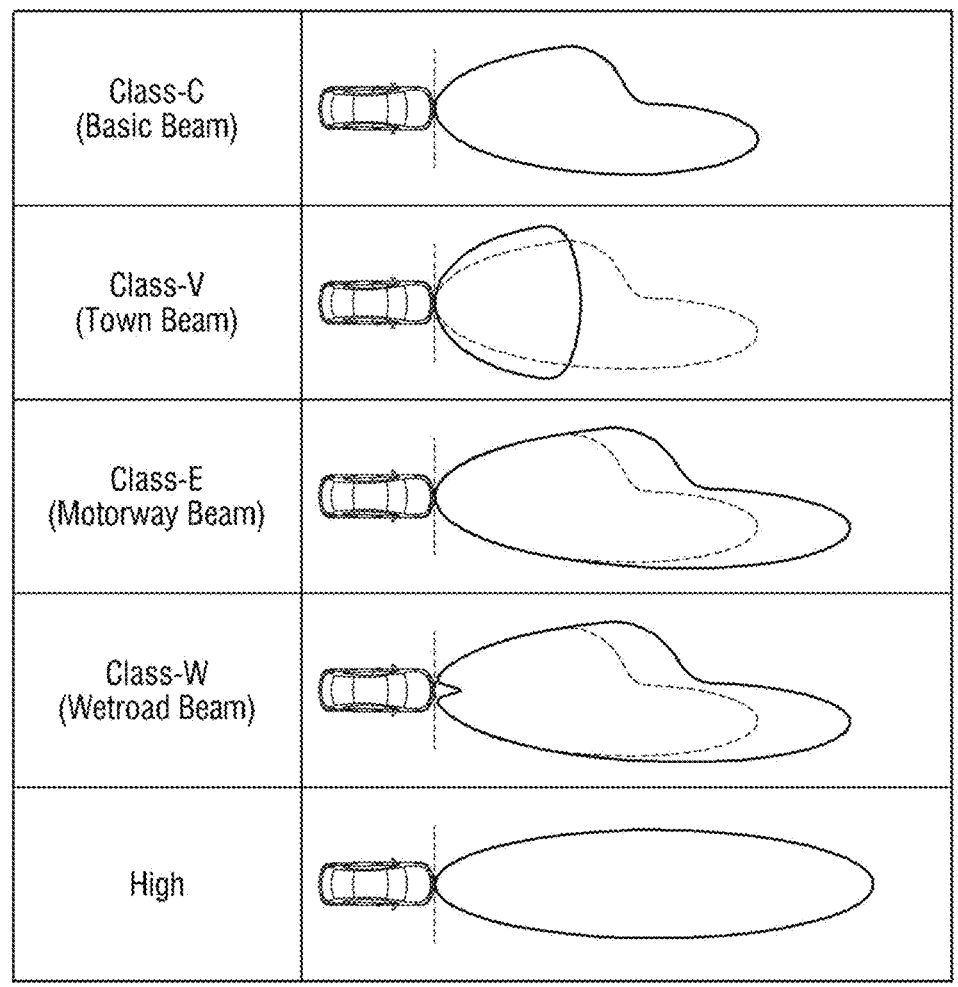
FIG. 6 is an exemplary diagram showing light distribution patterns according to an exemplary embodiment of the present invention.

A side of the body 131 on which the first shield protrusion portion 132 or the second shield protrusion portion 133 is not formed may form the high-beam light distribution pattern. In the current embodiment of the present invention, the high-beam light distribution pattern may be formed by a portion of the body 131 where no shield protrusions are formed. However, the present invention is not limited thereto. On a surface of the body 131, that forms the high-beam light distribution pattern, two flashing regions for performing the flashing function are set. A first flashing region 131a is set apart from the second shield protrusion portion 133 and a second flashing region is set at a portion adjacent to the second shield protrusion portion 133. In addition, the flashing light distribution pattern formed by the first flashing region 131a and the second flashing region 131b may be lower than the high-beam light distribution pattern since part of light is blocked by an edge of the first shield protrusion portion 132 and the second shield protrusion portion 133. Therefore, since an upper part of the flashing light distribution pattern is blocked by the first shield protrusion portion 132 and the second shield protrusion portion 133, the flashing light distribution pattern provides only a warning function without dazzling drivers ahead as much as the high-beam light distribution pattern. The Class-C, Class-V, Class-E and Class-W light distribution patterns and the high-beam light distribution pattern formed by the rotating shield 130 of FIG. 5 are as shown in FIG. 6.

Specifically, Class-C is a light distribution pattern suitable for use when a vehicle is driving on a country road or when there is no need to apply other light distribution patterns since the vehicle is not driving in special conditions. Class-V is a light distribution pattern suitable for vehicles driving in an environment (e.g., on city roads) in which more than a certain level of brightness is secured by ambient lighting.

Class-E is a light distribution pattern suitable for vehicles driving on expressways or on substantially straight roads. Class-W is a light distribution pattern suitable for vehicles driving on wet roads in the rain or similar weather conditions. The high-beam light distribution pattern is a light distribution pattern suitable for use to secure a long-range field of view when a distance to a vehicle ahead is more than a predetermined distance or when there are no vehicles ahead.

Figure 7:
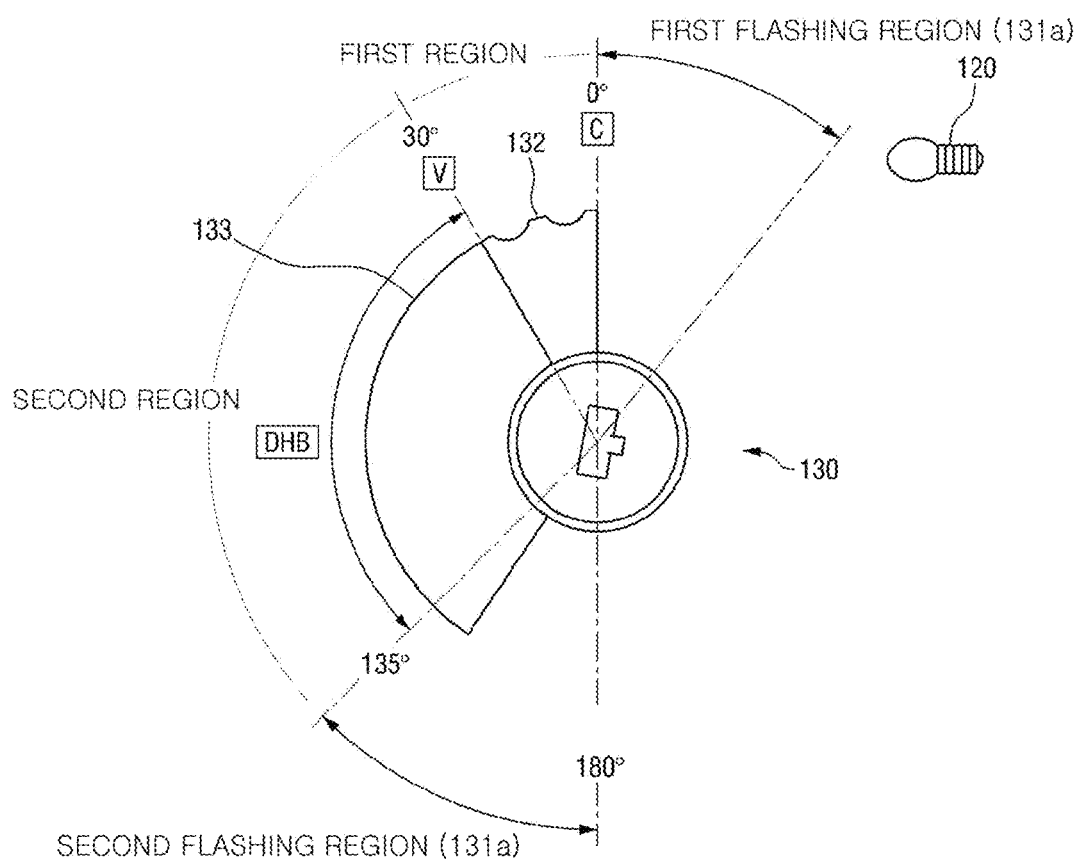
FIG. 7 is an exemplary side view of the rotating shield shown in FIG. 5, according to an exemplary embodiment of the present invention.

FIG. 7 is an exemplary side view of the rotating shield 130 shown in FIG. 5.

Referring to FIG. 7, the rotating shield 130 includes a first region in which the first shield protrusion portion 132 for changing to the low-beam light distribution pattern is located, a second region in which the second shield protrusion portion 133 for changing to the anti-dazzle high-beam light distribution pattern is located. The first flashing region 131a is set in a portion adjacent to the first region, and the second flashing region 131b which is set in a portion adjacent to the second region.

To perform a flashing function when a user inputs a flashing control command while driving a vehicle, a sensor detects whether a current light distribution pattern is a light distribution pattern (i.e., the low-beam light distribution pattern) formed by the first shield protrusion portion 132 or a light distribution pattern (i.e., the anti-dazzle high-beam light distribution pattern) formed by the second shield protrusion portion 133. Here, the flashing control command input by the user may also be input by a flashing control switch. In FIG. 7, a portion of the rotating shield 130 that blocks part of light emitted from a light source 120 may be the first shield protrusion portion 132. That is, the current light distribution pattern may be the low-beam light distribution pattern.

In other words, since the light distribution pattern determined based on the rotation angle of the rotating shied 130 may be the low-beam light distribution pattern, a region corresponding to the current light distribution pattern may be the first region. Therefore, it may be most effective for the first flashing region 131a to perform the flashing function.

Accordingly, the rotating shield 130 may be rotated toward the second shield protrusion portion 133 by a predetermined angle, for the first flashing region 131a, set on the other side of the first shield protrusion portion 132 from the second shield protrusion portion 133, to perform the flashing function. Since the rotating shield 130 changes from the low-beam light distribution pattern directly to the flashing light distribution pattern, it may perform the flashing function substantially faster than conventional flashing function methods.

When a portion of the rotating shield 130 that blocks part of light emitted from the light source 120 is the second shield protrusion portion 133 (that is, when the current light distribution pattern is the anti-dazzle high-beam light distribution pattern), the rotating shield 130 may be rotated toward the first shield protrusion portion 132 by a predetermined angle. Accordingly, the second flashing region 131b set on the other side of the second shield protrusion portion 133 from the first shield protrusion portion 132 may perform the flashing function. That is, since the rotating shield 130 rotated based on the current light distribution pattern may be rotated in the direction in which the rotating shield 130 is rotated by a smaller angle, the flashing function may be performed substantially faster than conventional flashing function methods.

Figure 8:
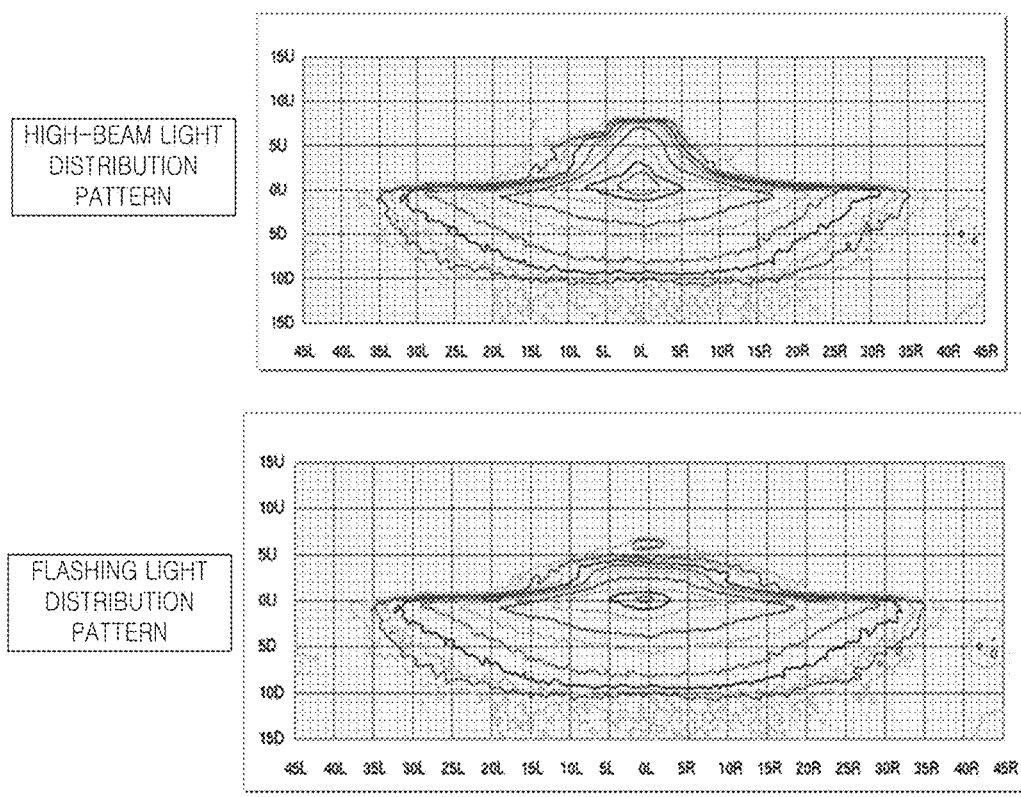
FIG. 8 is an exemplary diagram showing light distribution patterns formed by a headlamp according to an exemplary embodiment of the present invention.

FIG. 8 is an exemplary diagram illustrating light distribution patterns formed by a headlamp according to an exemplary embodiment of the present invention.

Referring to FIG. 8, the flashing light distribution pattern may be formed lower than the high-beam light distribution pattern since part of light is blocked by an edge of the first shield protrusion portion 132 and the second shield protrusion portion 133. To form the flashing light distribution pattern, the rotating unit 220 rotates the rotating shield 130 at a predetermined angle such that part of light is blocked by an edge of the first shield protrusion portion 132 and the second shield protrusion portion 133. Here, "L" and "R" respectively indicate unit lengths in left and right directions, and "U" and "D" respectively indicate unit lengths in upward and downward directions. For example, when L and R are 10 cm, 5 L indicates a distance of 50 cm to the left, and 10 R indicates a distance of 100 cm to the right. In addition, when U and D are 5 cm, 5 U indicates a distance of 25 cm in the upward direction, and 10 D indicates a distance of 50 cm in the downward direction. The flashing light distribution pattern provides only a warning function without dazzling drivers ahead as much as the high-beam light distribution pattern.

Figure 9:
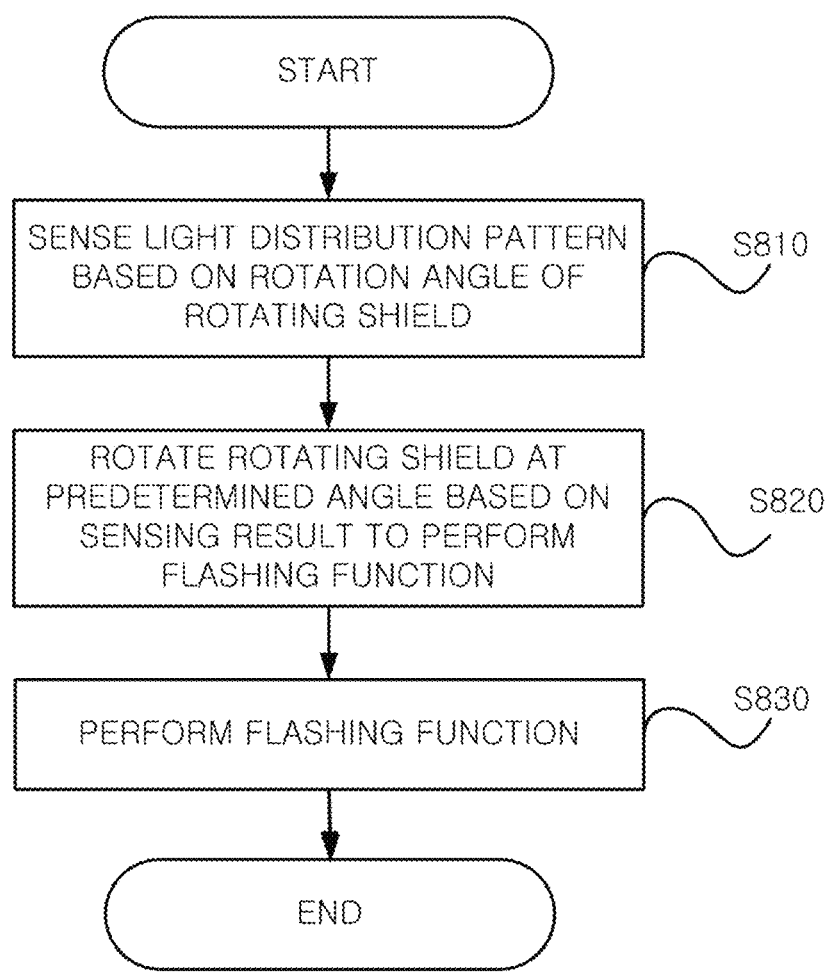
FIG. 9 is an exemplary flowchart illustrating a method of controlling a headlamp according to an exemplary embodiment of the present invention.

FIG. 9 is an exemplary flowchart illustrating a method of controlling a headlamp according to an exemplary embodiment of the present invention.

Referring to FIG. 9, to perform a flashing function (operation S810) when a user inputs a flashing control command while driving a vehicle, a sensor 210 detects a current light distribution pattern based on a rotation angle of a rotating shield 130. Here, the flashing control command input by the user may also be input by a flashing control switch. To perform the flashing function, a controller 240 rotates the rotating shield 130 at a predetermined angle based on the sensing result of the sensor 210 (operation S820).

That is, the sensor 210 detects whether the current light distribution pattern is a light distribution pattern (i.e., a low-beam light distribution pattern) formed by a first shield protrusion portion 132 or a light distribution pattern (i.e., an anti-dazzle high-beam light distribution pattern) formed by a second shield protrusion portion 133 based on the rotation angle of the rotating shield 130. Then, the controller 240 determines whether a region corresponding to the current light distribution pattern is adjacent to a first flashing region 131a or a second flashing region 131b based on the sensing result of the sensor 210 and rotates the rotating shield 130 such that the first or second flash region 131a or 131b performs the flashing function.

For example, when the light distribution pattern detected by the sensor 210 is the light distribution pattern formed by the first shield protrusion portion 132, the controller 240 rotates the rotating shield 130 toward the second shield protrusion portion 133 such that the first flashing region 131a, set on the other side of the first shield protrusion portion 132 from the second shield protrusion portion, 133 performs the flashing function. Therefore, the first flashing region 131a may perform the flashing function (operation S830).

That is, since the rotating shield 130, rotated based on the current light distribution pattern, is rotated in a direction in which the rotating shield 130 is rotated by a smaller angle, the flashing function may be performed substantially faster than conventional flashing function methods.

An apparatus and method for controlling a headlamp according to the present invention provide at least one of the following advantages.

A light distribution pattern of a vehicle headlamp may be detected, and a shield may be rotated by a predetermined angle in a direction in which the shield is rotated by a smaller angle based on the detected light distribution pattern. Therefore, a flashing function may be performed substantially faster than conventional flashing function methods. In addition, since the shield may rotated by a small angle to perform the flashing function, unnecessary changes of light distribution patterns may be reduced.

However, the effects of the present invention are not restricted to the one set forth herein. The above and other effects of the present invention will become more apparent to those skilled in the art to which the present invention pertains by referencing the claims.

While the present invention has been particularly shown and described with reference to exemplary embodiments thereof, it will be understood by those of ordinary skill in the art that various modifications, additions and substitutions are possible without departing from the spirit and scope of the present invention as disclosed in the accompanying claims. The exemplary embodiments should be considered in a descriptive sense only and not for purposes of limitation. The scope of the present invention is defined by the accompanying claims, rather than by the above-described detailed description. The meanings and scope of the claims, and all modifications or modified shapes, which are derived from equivalent concepts thereof, should be understood as being included in the scope of the present invention.

What is claimed is:

1. An apparatus for controlling a headlamp, the apparatus comprising:
   a rotating shield including a first shield protrusion portion, including a plurality of protrusions formed in a direction of a rotation axis of a rotatable body and a second shield protrusion portion disposed on a side of the first shield protrusion portion;
   a sensor detecting a rotation angle of the rotating shield and a light distribution pattern of a vehicle based on the rotation angle of the rotating shield; and
   a controller rotating the rotating shield around a central axis of a first angle toward the first shield protrusion portion or around a central axis of a second angle toward the second shield protrusion portion based on the sensor detections, outputting the detected light distribution pattern to perform a flashing pattern,
   wherein the rotating shield comprises one or more flashing regions for performing the flashing pattern, and each of the flashing regions is formed in a portion adjacent to the first shield protrusion portion or the second shield protrusion portion, and
   wherein the rotating shield rotates around the central axis in a direction of one of the flashing regions toward which the rotating shield is rotated by the smaller angle of the first and second angles and a portion of the light distribution pattern is blocked by an edge of the first shield protrusion portion or an edge of the second shield protrusion.

2. The apparatus of claim 1, wherein the first shield protrusion portion comprises a cut-off pattern selected from a group consisting of: Class-C, Class-E, Class-V and Class-W light distribution patterns, and the second shield protrusion portion comprises an anti-dazzle high-beam light distribution pattern.

3. The apparatus of claim 2, wherein a light distribution pattern for the flashing pattern is formed lower than a high-beam light distribution pattern.

4. The apparatus of claim 1, wherein the flashing pattern is performed by a flashing control switch.

5. The apparatus of claim 1, wherein the rotation angle determines whether the light distribution pattern is formed by the first shield protrusion or the second shield protrusion.

6. The apparatus of claim 5, wherein the light distribution pattern is formed by the first shield protrusion, the shield is rotated toward the second shield protrusion having the flashing pattern adjacent to the first shield protrusion.

7. The apparatus of claim 5, wherein the light distribution pattern is formed by the second shield protrusion, the shield is rotated toward the first shield protrusion having the flashing pattern adjacent to the second shield protrusion.

8. A method of controlling a headlamp, the method comprising:
   detecting, by a sensor, a rotation angle of a rotating shield, including a first shield protrusion portion and a second shield protrusion portion disposed on a side of the first shield protrusion portion and a light distribution pattern of a vehicle based on the rotation angle of the rotating shield; and
   rotating, by a controller, the rotating shield around a central axis of a first angle toward the first shield protrusion portion or around a central axis of a second angle toward the second shield protrusion portion based on the sensor detections, outputting the detected light distribution pattern, to perform a flashing pattern,
   wherein the rotating shield comprises one or more flashing regions for performing the flashing pattern, and each of the flashing regions is formed in a portion adjacent to the first shield protrusion portion or the second shield protrusion portion, and
   wherein for the flashing pattern, the rotating shield is rotated by the controller, in a direction of one of the flashing regions toward which the rotating shield is rotated around the central axis by the smaller angle of the first and second angles and a portion of the light distribution pattern is blocked by an edge of the first shield protrusion portion or an edge of the second shield protrusion portion.

9. The method of claim 8, wherein the first shield protrusion portion comprises a cut-off pattern selected from a group consisting of one or more of: Class-C, Class-E, Class-V and Class-W light distribution patterns, and the second shield protrusion portion comprises an anti-dazzle high-beam light distribution pattern.

10. The method of claim 8, wherein the flashing pattern is performed by a flashing control switch.

11. The method of claim 8, wherein a light distribution pattern for the flashing pattern is formed lower than a high-beam light distribution pattern.

12. The method of claim 8, determining by the sensor if the rotation angle forms the light distribution pattern by the first shield protrusion or the second shield protrusion.

13. The method of claim 12, forming by the first shield protrusion the light distribution pattern, and rotating the shield toward the second shield protrusion having the flashing pattern adjacent to the first shield protrusion.

14. The method of claim 12, forming by the second shield protrusion the light distribution pattern, and rotating the shield toward the first shield protrusion having the flashing pattern adjacent to the second shield protrusion.

15. An apparatus for controlling a headlamp, the apparatus comprising:
   a rotating shield including a first shield protrusion portion, including a plurality of protrusions formed in a direction of a rotation axis of a rotatable body and a second shield protrusion portion disposed on a side of the first shield protrusion portion;

a sensor detecting a rotation angle of the rotating shield and a light distribution pattern of a vehicle based on the rotation angle of the rotating shield; and a controller rotating the rotating shield around a central axis of a first angle toward the first shield protrusion portion or around a central axis of a second angle toward the second shield protrusion portion based on the sensor detections, outputting the detected light distribution pattern to perform a flashing pattern, wherein the rotating shield comprises one or more flashing regions for performing the flashing pattern, and each of the flashing regions is formed in a portion adjacent to the first shield protrusion portion or the second shield protrusion portion, wherein, the flashing pattern includes a high-beam light distribution pattern or a lower than the high-beam light distribution pattern, and wherein, the rotating shield rotates around the central axis in a direction of one of the flashing regions toward which the rotating shield is rotated by the smaller angle of the first and second angles and a portion of the light distribution pattern is blocked by an edge of the first shield protrusion portion or an edge of the second shield protrusion portion.

* * * * *